United States Patent
Ko et al.

(10) Patent No.: US 8,089,262 B2
(45) Date of Patent: Jan. 3, 2012

(54) COMPACT AND LIGHTWEIGHT POWER CONVERTER FOR HIGH POWER COMSUMPTION LOADS

(75) Inventors: Chuk Ko, Hong Kong (CN); Jerry Joseph Heep, Weatherford, TX (US)

(73) Assignee: RadioShack Corporation, Ft. Worth, TX (US)

( * ) Notice: Subject to any disclaimer, the term of this patent is extended or adjusted under 35 U.S.C. 154(b) by 573 days.

(21) Appl. No.: 12/167,498

(22) Filed: Jul. 3, 2008

(65) Prior Publication Data

US 2010/0002476 A1  Jan. 7, 2010

(51) Int. Cl.
*G05B 24/02* (2006.01)
(52) U.S. Cl. ....................................................... 323/320
(58) Field of Classification Search .................. 323/237, 323/300, 320; 363/34, 37
See application file for complete search history.

(56) References Cited

U.S. PATENT DOCUMENTS

| | | | |
|---|---|---|---|
| 7,245,508 B2 * | 7/2007 | Tokuda et al. ................ | 363/17 |
| 7,550,872 B2 * | 6/2009 | Hoekstra et al. ............. | 307/64 |
| 2001/0012209 A1 * | 8/2001 | Raddi et al. .................. | 363/37 |
| 2001/0026460 A1 * | 10/2001 | Ito et al. ....................... | 363/34 |
| 2008/0019155 A1 * | 1/2008 | Morishima et al. ........... | 363/37 |
| 2010/0002476 A1 * | 1/2010 | Ko et al. ....................... | 363/37 |

FOREIGN PATENT DOCUMENTS

JP  08126352  * 5/1996

* cited by examiner

*Primary Examiner* — Jeffrey Sterrett
(74) *Attorney, Agent, or Firm* — Law Office of Donald D. Mondul (57) ABSTRACT

An apparatus for shaping a varying input voltage signal received at an input locus to effect a desired varying output voltage signal at an output locus includes: (a) at least one energy transferring unit coupled with the input locus and with the output locus; and (b) at least one energy storing unit coupled with the at least one energy transferring unit. The at least one energy transferring unit presents at least one predetermined range of the input voltage signal at the output locus. The at least one energy transferring unit cooperates with the at least one energy storing unit to store energy in the at least one energy storing unit and to present energy from the at least one energy storing unit at the output locus when the input voltage signal is not presented at the output locus.

20 Claims, 5 Drawing Sheets

COMPACT AND LIGHTWEIGHT POWER CONVERTER FOR HIGH POWER COMSUMPTION LOADS

FIELD OF THE INVENTION

The present invention is directed to power converters, and especially to power converters configured for use with high power consumption devices.

BACKGROUND OF THE INVENTION

Power converters such as, by way of example and not by way of limitation, travel power converters configured for use with high power consumption consumer devices like hair dryers and curling irons may be bulky and expensive to manufacture because of substantial voltage transforming that is traditionally carried out in configuring such devices.

Travelers and other users of power converters desire lightweight, reliable, compact and robust apparatuses to facilitate packing and carrying the apparatus in luggage.

There is a need for an apparatus and method for shaping an input signal to effect a desired output signal that is lightweight, reliable, compact and robust.

SUMMARY OF THE INVENTION

An apparatus for shaping a varying input voltage signal received at an input locus to effect a desired varying output voltage signal at an output locus includes: (a) at least one energy transferring unit coupled with the input locus and with the output locus; and (b) at least one energy storing unit coupled with the at least one energy transferring unit. The at least one energy transferring unit presents at least one predetermined range of the input voltage signal at the output locus. The at least one energy transferring unit cooperates with the at least one energy storing unit to store energy in the at least one energy storing unit and to present energy from the at least one energy storing unit at the output locus when the input voltage signal is not presented at the output locus.

A method for shaping a varying input voltage signal received at an input locus to effect a desired varying output voltage signal at an output locus includes: (a) in no particular order: (1) providing at least one energy transferring unit coupled with the input locus and with the output locus; and (2) providing at least one energy storing unit coupled with the at least one energy transferring unit; (b) operating the at least one energy transferring unit to present at least one predetermined range of the input voltage signal at the output locus; (c) operating the at least one energy transferring unit in cooperation with the at least one energy storing unit to store energy in the at least one energy storing unit while the input voltage signal is presented at the output locus; and (d) operating the at least one energy transferring unit in cooperation with the at least one energy storing unit to present energy from the at least one energy storing unit at the output locus when the input voltage signal is not presented at the output locus.

It is, therefore, a feature of the present invention to provide an apparatus and method for shaping an input signal to effect a desired output signal that is lightweight, reliable, compact and robust.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
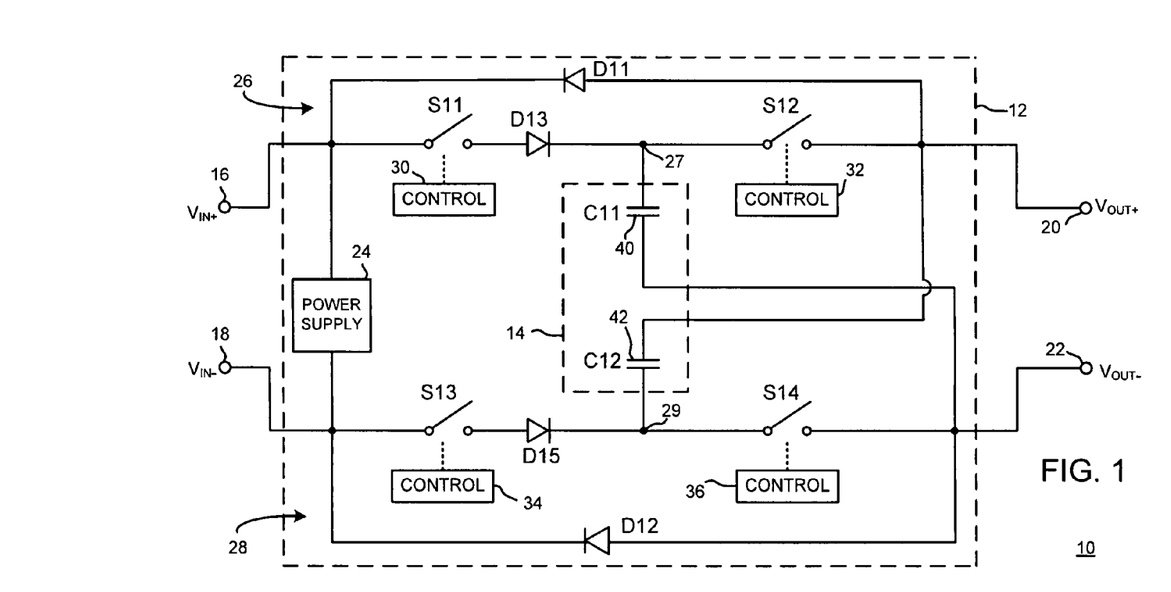
FIG. 1 is a schematic illustration of a simplified version of a full-wave signal handling apparatus configured according to the teachings of the present invention.

FIG. 1 is a schematic illustration of a simplified version of a full-wave signal handling apparatus configured according to the teachings of the present invention. In FIG. 1, a signal handling apparatus 10 includes a signal transferring or energy transferring section 12, an energy storing section 14, input loci 16, 18 and output loci 20, 22.

Energy transferring section 12 includes a power supply unit 24 coupled with a first energy transferring unit 26 and a second energy transferring unit 28. First energy transferring unit 26 includes a switch S11 with an associated control unit 30, a second switch S12 with an associated control unit 32 and a diode D11 coupled to provide reverse feedback signals in parallel with switches S11, S12. Diode D11 shorts switches S11, S12 when electrical potential at input locus 16 is negative and electrical potential at input locus 18 is positive. First energy transferring unit 26 is coupled for transferring energy from input locus 16 to output locus 20. Second energy transferring unit 28 includes a switch S13 with an associated control unit 34, a second switch S14 with an associated control unit 36 a diode D12 coupled to provide reverse feedback signals in parallel with switches S13, S14. Diode D12 shorts switches S13, S14 when electrical potential at input locus 16 is positive and electrical potential at input locus 18 is negative. Second energy transferring unit 28 is coupled for transferring energy from input locus 18 to output locus 22.

Energy storing section 14 includes a first energy storing unit 40 coupled between output locus 22 and a connecting locus 27 between switches S11, S12 and a second energy storing unit 42 coupled between output locus 20 and a connecting locus 29 between switches S13, S14. First energy storing unit 40 is illustrated by way of example and not by way of limitation in FIG. 1 as embodied in a capacitor C11. Second energy storing unit 42 is illustrated by way of example and not by way of limitation in FIG. 1 as embodied in a capacitor C12. A diode D13 is coupled in series between switch S11 and connecting locus 27. Diode D13 prevents switch S11 from draining capacitor C11. A diode D15 is coupled between switch S13 and connecting locus 29. Diode D15 prevents switch S13 from draining capacitor C12.

Control units 30, 32, 34, 36 cooperate with diodes D11, D12, D13, D15 and capacitors C11, C12 in actuating switches S11, S12, S13, S14 to shape an input signal received at input loci 16, 18 to effect a desired output signal at output loci 20, 22. Control units 30, 32, 34, 36 control switch S11 to turn on when signal 52 is above 0 volts and to turn off when signal 52 is at $+V_2$ volts. Control units 30, 32, 34, 36 control switch S13 to turn on when signal 52 is below 0 volts and to turn off when signal 52 is at $-V_2$ volts. Control units 30, 32, 34, 36 control switch S12 to turn on when signal 52 is above 0 volts and to turn off when signal 52 is less than 0 volts. Control units 30, 32, 34, 36 control switch S14 to turn on when signal 52 is below 0 volts and to turn off when signal 52 is greater than 0 volts.

Figure 2:
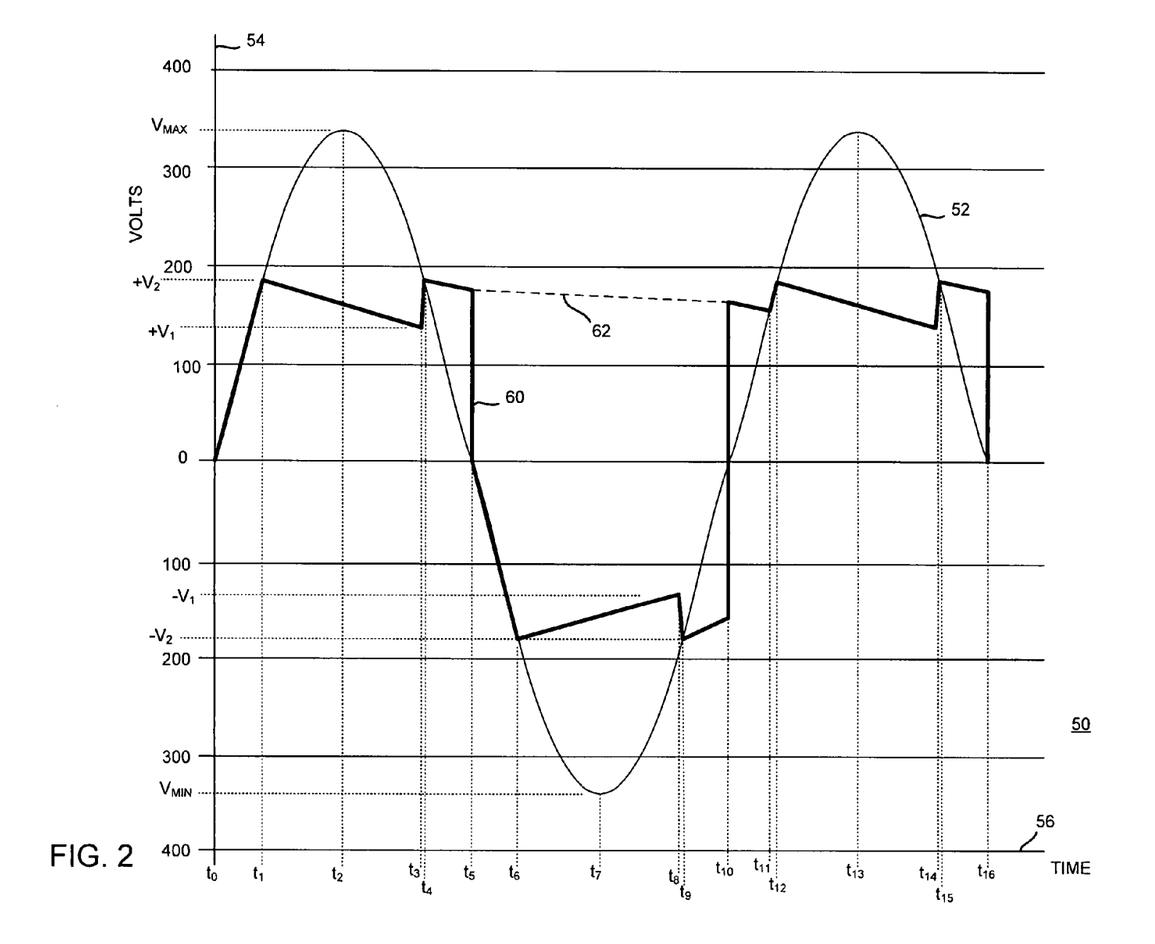
FIG. 2 is a graphic illustration of representative signals that may be involved in using the present invention.

FIG. 2 is a graphic illustration of representative signals that may be involved in using the present invention. In FIG. 2, a graphic plot 50 indicates a signal 52 plotted with respect to a vertical axis 54 representing signal strength and a horizontal axis 56 representing time. In the exemplary plot 50 illustrated in FIG. 2, signal 52 is a voltage signal and vertical axis 54 represents volts.

Signal 52 makes a positive excursion during a time interval $t_0$-$t_5$ and during a time interval $t_{10}$-$t_{16}$ from 0 volts to a positive extreme value at times $t_2$ and $t_{13}$ representing a maximum signal strength or voltage $V_{MAX}$. Signal 52 makes a negative excursion during a time interval $t_5$-$t_{10}$ from 0 volts to a negative extreme value at time $t_7$ representing a minimum signal strength or voltage $V_{MIN}$.

FIG. 2 also indicates a signal 60 representing an output signal. One may observe that output signal 60 is a substantially square-wave representation of input signal 52. By way of example and not by way of limitation, signal 60 may be an output signal presented at output loci 20, 22 (FIG. 1). Regarding FIGS. 1 and 2 together, during time interval $t_0$-$t_1$, switches S11 and S12 are closed so that signal 60 is presented at output locus 20 substantially as signal 52 passed to output locus 20. Capacitor C11 is charged during time interval $t_0$-$t_1$. At time $t_1$ when signal 52 reaches a value of $+V_2$, switch S11 is opened and switch S12 remains closed so that signal 60 is presented at output locus 20 substantially as energy provided from capacitor C11 as capacitor C11 discharges during a time interval $t_1$-$t_3$. Diode D13 prevents switch S11 from affecting output at output locus 20 so long as voltage across capacitor C11 is greater than the voltage level of signal 52. At time $t_3$, when signal 52 reaches voltage $+V_2$, switch S11 is closed. Because voltage across capacitor C11 is less than the voltage level of signal 52 (i.e., $+V_1$), switch S11 affects signal 60 to substantially present signal 52 at output locus 20 and capacitor C11 charges during a time interval $t_3$-$t_4$. The time interval $t_3$-$t_4$ may be very short. After time $t_4$ voltage across capacitor C11 is again greater than the voltage level of signal 52 so diode D13 opens, protecting the charge in capacitor C11.

Switch S12 remains closed so that signal 60 is presented at output locus 20 substantially as energy provided from capacitor C11 as capacitor C11 discharges during a time interval $t_4$-$t_5$. At time $t_5$ signal 52 is at a 0 value and switches S11, S12 are opened. During time interval $t_5$-$t_6$, switches S13 and S14 are closed so that signal 60 is presented at output locus 22 substantially as signal 52 passed to output locus 22 and capacitor C12 is charged. At time $t_6$ when signal 52 reaches a value of $-V_2$, switch S13 is opened and switch S14 remains closed so that signal 60 is presented at output locus 22 substantially as energy provided from capacitor C12 as capacitor C12 discharges during a time interval $t_6$-$t_8$.

Diode D15 prevents switch S13 from affecting output at output locus 22 so long as voltage across capacitor C12 is higher than the voltage level of signal 52. At time $t_8$, when signal 52 reaches voltage $-V_2$, switch S13 is closed. Because voltage across capacitor C12 is lower than the voltage level of signal 52 (i.e., $-V_1$), switch S13 affects signal 60 to substantially present signal 52 at output locus 22 and capacitor C12 charges during a time interval $t_8$-$t_9$. The time interval $t_8$-$t_9$ may be very short. After time $t_9$ voltage across capacitor C12 is again higher than the voltage level of signal 52 so diode D15 opens, protecting the voltage in the capacitor from the effects of the closed S13. Switch S14 remains closed so that signal 60 is presented at output locus 22 substantially as energy provided from capacitor C12 as capacitor C12 discharges during a time interval $t_9$-$t_{10}$. At time $t_{10}$ signal 52 is at a 0 value, switch S14 is opened and switch S12 is closed. Switch S11 may be closed at time $t_{10}$, but diode D13 cooperates with control unit 30 to ensure that switch S11 does not affect output at output locus 20 so long as signal 52 is less than the voltage across capacitor C11. Capacitor C11 may have discharged somewhat during the time interval $t_5$-$t_{10}$ as indicated by a discharge indicating line 62. At time $t_{10}$ voltage across capacitor C11 is substantially the same as voltage across capacitor C11 was at time $t_5$. Charge remaining across capacitor C11 at time $t_{10}$ is greater than the voltage level of signal 52 to switch S11. When voltage across capacitor C11 is no longer greater than voltage provide by signal 52, as at time $t_{11}$, switch S11 is permitted to affect output at output locus 20 so that signal 60 is presented at output locus 20 substantially as signal 52 passed to output locus 20 and capacitor C11 is charged during the time interval $t_{11}$-$t_{12}$. At time $t_{12}$ when signal 52 reaches a value of $+V_2$, switch S11 is opened and switch S12 remains closed so that signal 60 is presented at output locus 20 substantially as energy provided from capacitor C11 as capacitor C11 is discharged during a time interval $t_{12}$-$t_{14}$.

At time $t_{14}$, when signal 52 reaches voltage $+V_2$, switch S11 is closed. Because voltage across capacitor C11 is less than the voltage level of signal 52 (i.e., $+V_1$), switch S11 affects signal 60 to substantially present signal 52 at output locus 20 and capacitor C11 charges during a time interval $t_{14}$-$t_{15}$. The time interval $t_{14}$-$t_{15}$ may be very short. After time $t_{15}$ voltage across capacitor C11 is again greater than the voltage level of signal 52 so switch S11 is open. Switch S12 remains closed so that signal 60 is presented at output locus 20 substantially as energy provided from capacitor C11 as capacitor C11 discharges during a time interval $t_{15}$-$t_{16}$. At time $t_{16}$ signal 52 is at a 0 value and switches S11, S12 are opened.

The first positive half cycle of the process during time interval $t_0$-$t_5$ differs from the second positive half-cycle during time interval $t_{10}$-$t_{16}$ because capacitors C11, C12 are substantially fully discharged at apparatus 10 startup time to so there is no need to account for comparative voltages across capacitor C11 and signal 52, as is the case at the outset of the second positive half-cycle during time interval $t_{10}$-$t_{16}$. Subsequent half-cycles (positive and negative) may appear substantially as shown in the interval $t_{10}$-$t_{16}$, as will be understood by those skilled in the art of signal processing.

Figure 3:
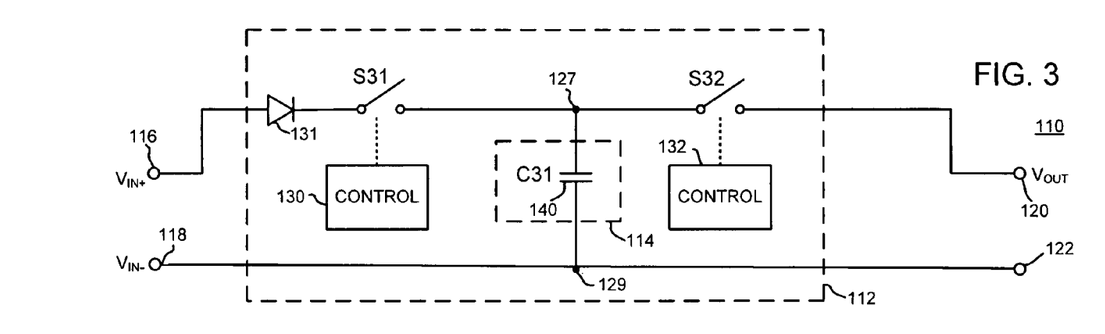
FIG. 3 is a schematic illustration of a simplified version of a half-wave signal handling apparatus configured according to the teachings of the present invention.

FIG. 3 is a schematic illustration of a simplified version of a half-wave signal handling apparatus configured according to the teachings of the present invention. In FIG. 3, a signal handling apparatus 110 includes a signal transferring or energy transferring unit 112, an energy storing unit 114, input loci 116, 118 and output loci 120, 122.

Energy transferring unit 112 includes a switch S31 with an associated control unit 130 and a second switch S32 with an associated control unit 132. Energy transferring unit 112 is coupled for transferring energy from input locus 116 to output locus 120. Input locus 118 is coupled with output locus 122.

Energy storing section 114 includes an energy storing unit 140 coupled between output locus 122 and a connecting locus 127 between switches S31, S32. Energy storing unit 140 is illustrated by way of example and not by way of limitation in FIG. 3 as embodied in a capacitor C31.

Control units 130, 132 cooperate with diode 131 and capacitor C31 in actuating switches S31, S32 to shape an input signal received at input loci 116, 118 to effect a desired half-wave output signal at output loci 120, 122. Diode 131 operates to ensure that apparatus 110 treats only a positive half-wave of input signal 52 (FIG. 2). Control units 130, 132 control switch S11 to turn on when signal 52 is above 0 volts and to turn off when signal 52 is at +$V_2$ volts. Control units 130, 132 control switch S12 to turn on when signal 52 is above 0 volts and to turn off when signal 52 is less than 0 volts. Diode 131 coupled in series with switch S31 prevents switch S31 from draining capacitor C31.

Apparatus 110 operates with signal 52 (FIG. 2) substantially as described in connection with operation of apparatus 10 (FIG. 1) with signal 52 in time intervals $t_0$-$t_5$ and $t_{10}$-$t_{16}$ in effecting half-wave treatment of signal 52 to present a half-wave output at output loci 120, 122.

By way of further example and not by way of limitation, signal 60 (FIG. 2) may be an output signal presented at output loci 120, 122 (FIG. 3). Regarding FIGS. 2 and 3 together, during time interval $t_0$-$t_1$, switches S31 and S32 are closed so that signal 60 is presented at output locus 120 substantially as signal 52 passed to output locus 120. Capacitor C31 is charged during time interval $t_0$-$t_1$. At time $t_1$ when signal 52 reaches a value of +$V_2$, switch S31 is opened and switch S32 remains closed so that signal 60 is presented at output locus 120 substantially as energy provided from capacitor C31 as capacitor C31 discharges during a time interval $t_1$-$t_3$.

Diode 131 prevents switch S31 from affecting output at output locus 120 so long as voltage across capacitor C31 is greater than the voltage level of signal 52. At time $t_3$, when signal 52 reaches voltage +$V_2$, switch S31 is closed. Because voltage across capacitor C31 is less than the voltage level of signal 52 (i.e., +$V_1$), switch S31 affects signal 60 to substantially present signal 52 at output locus 20 and capacitor C31 charges during a time interval $t_3$-$t_4$. The time interval $t_3$-$t_4$ may be very short. After time $t_4$ voltage across capacitor C31 is again greater than the voltage level of signal 52 so switch S31 is open. Switch S32 remains closed so that signal 60 is presented at output locus 120 substantially as energy provided from capacitor C31 as capacitor C31 discharges during a time interval $t_4$-$t_5$. At time $t_5$ signal 52 is at a 0 value and switches S31, S32 are opened. Between $t_5$ and $t_{10}$ The signal at the output will be 0 volts.

At time $t_{10}$ signal 52 is at a 0 value and switch S32 is closed. Switch S31 may be closed at time $t_{10}$, but diode D33 cooperates with control unit 130 to ensure that switch S31 does not affect output at output locus 120 so long as signal 52 is less than the voltage across capacitor C31. Capacitor C31 may have discharged somewhat during the time interval $t_5$-$t_{10}$ as indicated by a discharge indicating line 62. At time $t_{10}$ voltage across capacitor C31 is substantially the same as voltage across capacitor C31 was at time $t_5$. Charge remaining across capacitor C31 at time $t_{10}$ is greater than the voltage level of signal 52 to switch S31. When voltage across capacitor C31 is no longer greater than voltage provide by signal 52, as at time $t_{11}$, switch S31 is permitted to affect output at output locus 120 so that signal 60 is presented at output locus 120 substantially as signal 52 passed to output locus 120 and capacitor C31 is charged during a time interval $t_{11}$-$t_{12}$. At time $t_{12}$ when signal 52 reaches a value of +$V_2$, switch S31 is opened and switch S32 remains closed so that signal 60 is presented at output locus 120 substantially as energy provided from capacitor C31 as capacitor C31 is discharged during a time interval $t_{12}$-$t_{14}$.

At time $t_{14}$, when signal 52 reaches voltage +$V_2$, switch S31 is closed. Because voltage across capacitor C31 is less than the voltage level of signal 52 (i.e., +$V_1$), switch S31 affects signal 60 to substantially present signal 52 at output locus 120 and capacitor C31 charges during a time interval $t_{14}$-$t_{15}$. The time interval $t_{14}$-$t_{15}$ may be very short. After time $t_{15}$ voltage across capacitor C31 is again greater than the voltage level of signal 52 so switch S31 is open. Switch S32 remains closed so that signal 60 is presented at output locus 120 substantially as energy provided from capacitor C31 as capacitor C31 discharges during a time interval $t_{15}$-$t_{16}$. At time $t_{16}$ signal 52 is at a 0 value and switches S31, S32 are opened.

Figure 4:
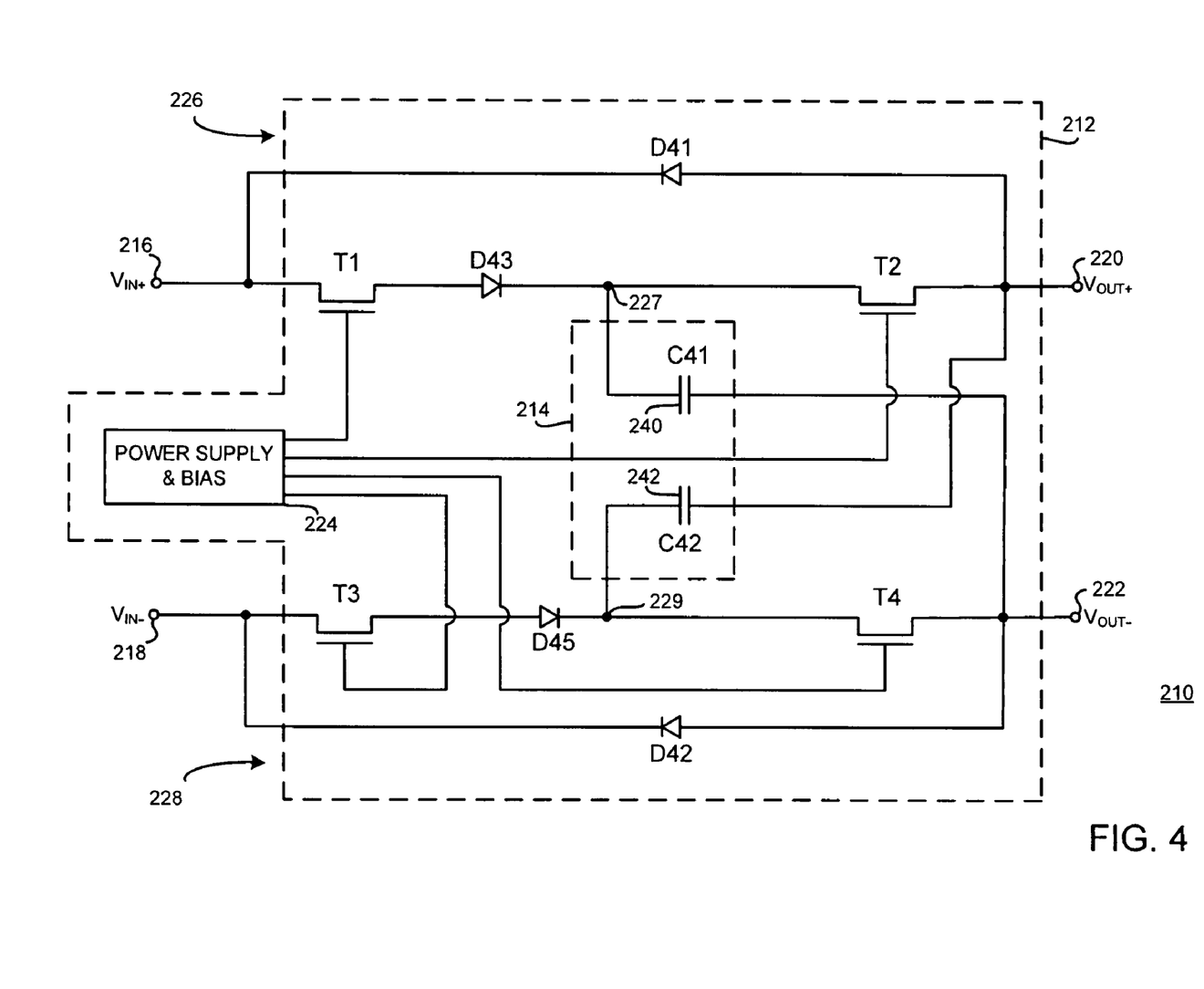
FIG. 4 is a schematic illustration of a solid-state configuration of a full-wave signal handling apparatus configured according to the teachings of the present invention.

FIG. 4 is a schematic illustration of a solid-state configuration of a full-wave signal handling apparatus configured according to the teachings of the present invention. In FIG. 4, a signal handling apparatus 210 includes a signal transferring or energy transferring section 212, an energy storing section 214, input loci 216, 218 and output loci 220, 222.

Energy transferring section 212 includes a power supply and bias unit 224 coupled with transistors T1, T2 in a first energy transferring unit 226 and coupled with transistors T3, T4 in a second energy transferring unit 228. A diode D41 shorts transistors T1, T2 when electrical potential at input locus 216 is negative and electrical potential at input locus 218 is positive. First energy transferring unit 226 is coupled for transferring energy from input locus 216 to output locus 220. A diode D42 shorts transistors T3, T4 when electrical potential at input locus 216 is positive and electrical potential at input locus 218 is negative. Second energy transferring unit 228 is coupled for transferring energy from input locus 218 to output locus 222. Transistors T1, T2, T3, T4 may be embodied, by way of example and not by way of limitation, in Field Effect Transistors (FETs). By way of further example and not by way of limitation, transistors T1, T2, T3, T4 may be embodied in Insulated Gate Bipolar Transistors (IGBTs).

Energy storing section 214 includes a first energy storing unit 240 coupled between output locus 222 and a connecting locus 227 between transistors T1, T2 and a second energy storing unit 242 coupled between output locus 220 and a connecting locus 229 between transistors T3, T4. First energy storing unit 240 is illustrated by way of example and not by way of limitation in FIG. 4 as embodied in a capacitor C41. Second energy storing unit 242 is illustrated by way of example and not by way of limitation in FIG. 4 as embodied in a capacitor C42. A diode D43 is coupled in series between transistor T1 and connecting locus 227. Diode D43 prevents transistor T1 from draining capacitor C41. A diode D45 is coupled between transistor T3 and connecting locus 229. Diode D45 prevents transistor T3 from draining capacitor C42.

Power supply and bias unit may be embodied in various components coupled throughout apparatus 210. Power supply and bias unit 224 may provide reference signals or values such as, by way of example and not by way of limitation, reference voltage signals and reference timing signals to control transistor T1 to turn on when signal 52 is between 0 volts and $+V_2$ and to turn off when signal 52 is greater than $+V_2$ volts. Power supply and bias unit 224 may control transistor T3 to turn on when signal 52 is between 0 volts and $-V_2$ and to turn off when signal 52 is less than $-V_2$ volts. Power supply and bias unit 224 may control transistor T2 to turn on when signal 52 is above 0 volts and to turn off when signal 52 is less than 0 volts. Power supply and bias unit 224 may control transistor T4 to turn on when signal 52 is below 0 volts and to turn off when signal 52 is greater than 0 volts.

By way of still further example and not by way of limitation, signal 60 (FIG. 2) may be an output signal presented at output loci 220, 222 (FIG. 4). Regarding FIGS. 2 and 4 together, during time interval $t_0$-$t_1$, transistors T1 and T2 are turned on so as to be conducting so that signal 60 is presented at output locus 220 substantially as signal 52 passed to output locus 220. Capacitor C41 is charged during time interval $t_0$-$t_1$. At time $t_1$ when signal 52 reaches a value of $+V_2$, transistor T1 is turned off so as to be non-conducting and transistor T2 turned on so that signal 60 is presented at output locus 220 substantially as energy provided from capacitor C41 as capacitor C41 discharges during a time interval $t_1$-$t_3$.

Diode D43 prevents transistor T1 from affecting output at output locus 220 so long as voltage across capacitor C41 is greater than the voltage level of signal 52. At time $t_3$, when signal 52 reaches voltage $+V_2$, transistor T1 is turned on. Because voltage across capacitor C41 is less than the voltage level of signal 52 (i.e., $+V_1$), transistor T1 affects signal 60 to substantially present signal 52 at output locus 220 and capacitor C41 charges during a time interval $t_3$-$t_4$. The time interval $t_3$-$t_4$ may be very short. After time $t_4$ voltage across capacitor C41 is again greater than the voltage level of signal 52 so transistor T1 is turned off. Transistor T2 remains turned on so that signal 60 is presented at output locus 220 substantially as energy provided from capacitor C41 as capacitor C41 discharges during a time interval $t_4$-$t_5$. At time $t_5$ signal 52 is at a 0 value and transistors T1, T2 are turned off.

During time interval $t_5$-$t_6$, transistors T3 and T4 are turned on so that signal 60 is presented at output locus 222 substantially as signal 52 passed to output locus 222 and capacitor C42 is charged. At time $t_6$ when signal 52 reaches a value of $-V_2$, transistor T3 is turned off and transistor T4 remains turned on so that signal 60 is presented at output locus 222 substantially as energy provided from capacitor C42 as capacitor C42 discharges during a time interval $t_6$-$t_8$.

Diode D45 prevents transistor T3 from affecting output at output locus 222 so long as voltage across capacitor C42 is lower than the voltage level of signal 52. At time $t_9$, when signal 52 reaches voltage $-V_2$, transistor T3 is turned on. Because voltage across capacitor C42 is higher than the voltage level of signal 52 (i.e., $-V_1$), transistor T3 affects signal 60 to substantially present signal 52 at output locus 222 and capacitor C42 charges during a time interval $t_8$-$t_9$. The time interval $t_8$-$t_9$ may be very short. After time $t_9$ voltage across capacitor C42 is again lower than the voltage level of signal 52 so transistor T3 is turned off. Transistor T4 remains turned on so that signal 60 is presented at output locus 222 substantially as energy provided from capacitor C42 as capacitor C43 discharges during a time interval $t_9$-$t_{10}$. At time $t_{10}$ signal 52 is at a 0 value and transistors T3, T4 are turned off.

At time $t_{12}$ signal 52 is at a 0 value, transistor T4 is turned off and transistor T2 is turned on. Transistor T1 may be closed at time $t_{10}$, but diode D43 ensures that transistor T1 does not affect output at output locus 220 so long as signal 52 is less than the voltage across capacitor C41. Capacitor C41 may have discharged somewhat during the time interval $t_5$-$t_{10}$ as indicated by a discharge indicating line 62. At time $t_{10}$ voltage across capacitor C41 is substantially the same as voltage across capacitor C41 was at time $t_5$. Charge remaining across capacitor C41 at time $t_{10}$ is greater than the voltage level of signal 52 to transistor T1. When voltage across capacitor C41 is no longer greater than voltage provide by signal 52, as at time $t_{11}$, transistor T1 is permitted to affect output at output locus 220 so that signal 60 is presented at output locus 220 substantially as signal 52 passed to output locus 220 and capacitor C41 is charged during a time interval $t_{11}$-$t_{12}$. At time $t_{12}$ when signal 52 reaches a value of $+V_2$, transistor T1 is turned off and transistor T2 remains turned on so that signal 60 is presented at output locus 220 substantially as energy provided from capacitor C41 as capacitor C41 is discharged during a time interval $t_{12}$-$t_{14}$.

At time $t_{14}$, when signal 52 reaches voltage $+V_2$, transistor T1 is turned on. Because voltage across capacitor C41 is less than the voltage level of signal 52 (i.e., $+V_1$), transistor T1 affects signal 60 to substantially present signal 52 at output locus 220 and capacitor C41 charges during a time interval $t_{14}$-$t_{15}$. The time interval $t_{14}$-$t_{15}$ may be very short. After time $t_{15}$ voltage across capacitor C41 is again greater than the voltage level of signal 52 so transistor T1 is turned off. Transistor T2 remains turned on so that signal 60 is presented at output locus 220 substantially as energy provided from capacitor C41 as capacitor C41 discharges during a time interval $t_{15}$-$t_{16}$. At time $t_{16}$ signal 52 is at a 0 value and transistors T1, T2 are turned off.

Figure 5:
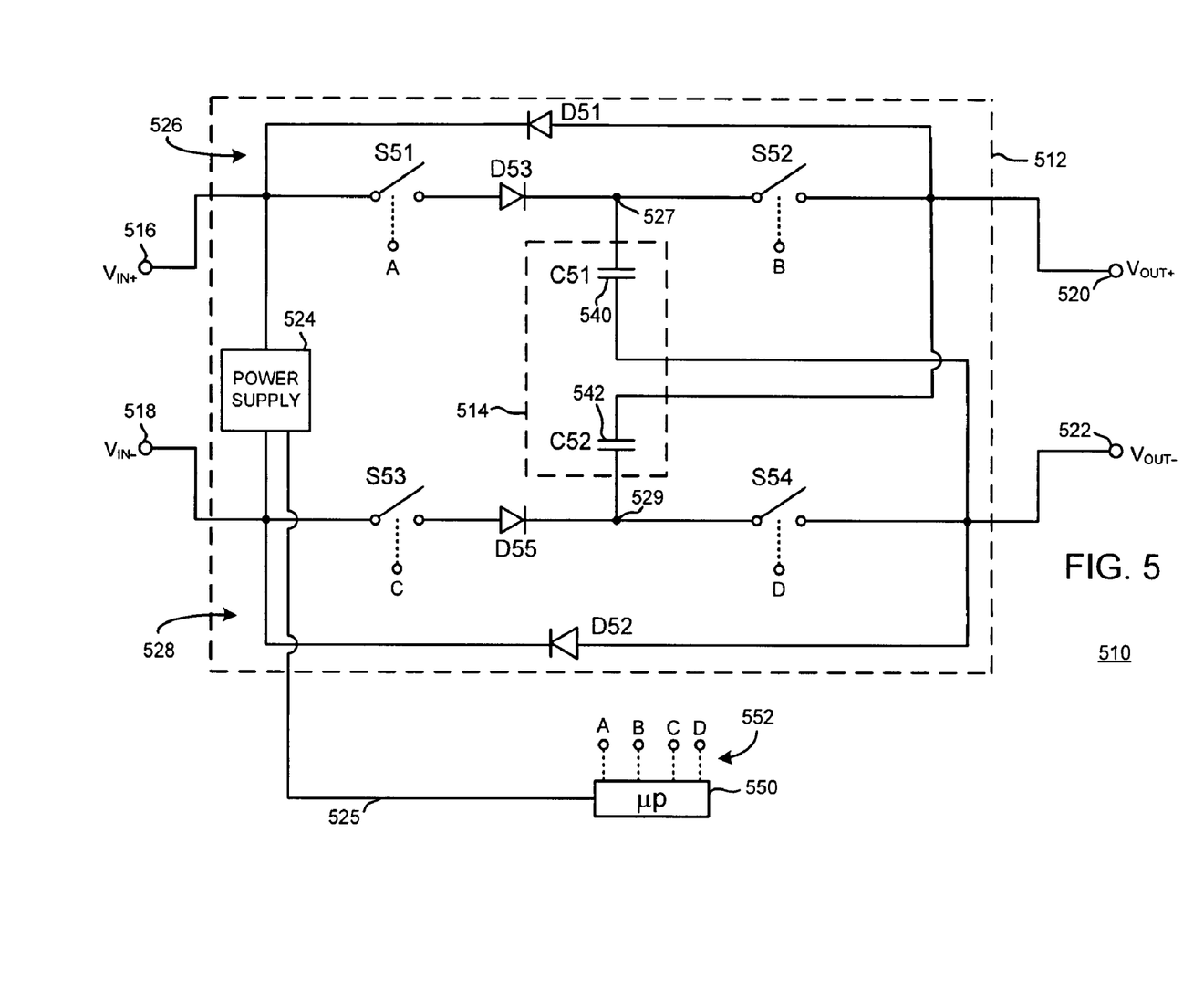
FIG. 5 is a schematic illustration of a simplified version of a microprocessor-controlled configuration of a full-wave signal handling apparatus configured according to the teachings of the present invention.

FIG. 5 is a schematic illustration of a simplified version of a microprocessor-controlled configuration of a full-wave signal handling apparatus configured according to the teachings of the present invention. In FIG. 5, a signal handling apparatus 510 includes a signal transferring or energy transferring section 512, an energy storing section 514, input loci 516, 518, output loci 520, 522 and a microprocessor unit 550.

Energy transferring section 512 includes a power supply unit 524 coupled with a first energy transferring unit 526 and a second energy transferring unit 528. First energy transferring unit 526 includes a switch S51, a switch S52 and a diode D51 coupled to provide reverse feedback signals in parallel with switches S51, S52. Diode D51 shorts switches S51, S52 when electrical potential at input locus 516 is negative and electrical potential at input locus 518 is positive. First energy transferring unit 526 is coupled for transferring energy from input locus 516 to output locus 520. Second energy transferring unit 528 includes a switch S53, a switch S54 and a diode D52 coupled to provide reverse feedback signals in parallel with switches S53, S54. Diode D52 shorts switches S53, S54 when electrical potential at input locus 516 is positive and electrical potential at input locus 518 is negative. Second energy transferring unit 528 is coupled for transferring energy from input locus 518 to output locus 522.

Energy storing section 514 includes a first energy storing unit 540 coupled between output locus 522 and a connecting locus 527 between switches S51, S52 and a second energy storing unit 542 coupled between output locus 520 and a connecting locus 529 between switches S53, S54. First energy storing unit 540 is illustrated by way of example and not by way of limitation in FIG. 5 as embodied in a capacitor C51. Second energy storing unit 542 is illustrated by way of example and not by way of limitation in FIG. 5 as embodied in a capacitor C52. A diode D53 is coupled in series between switch S51 and connecting locus 527. Diode D53 prevents switch S51 from draining capacitor C51. A diode D55 is coupled between switch S53 and connecting locus 529. Diode D55 prevents switch S53 from draining capacitor C52.

Power supply 524 may be embodied in various components coupled throughout apparatus 510 to establish desired bias levels, threshold levels and other operating parameters, as is known by those skilled in the art of circuit design. Power supply 524 may provide reference signals such as, by way of example and not by way of limitation, reference timing signals to microprocessor unit 550 via a line 525. Microprocessor unit 550 may control apparatus 510 to effect operations based upon timing references rather than based upon sensed voltage levels, as described herein in connection with FIGS. 1 and 4.

A modern microprocessor such as microprocessor unit 550 may contain one or more timing counters (sometimes referred to as timers). The timers in microprocessor unit 550 are not shown in detail in FIG. 5, but are understood by those skilled in the art of microprocessor-controlled apparatus design. Control signals may be presented by microprocessor unit 550 at output pins 552 to convey timing or operating signals within apparatus 510. In the embodiment illustrated as apparatus 510 output pin A is coupled for affecting operation of switch S51, output pin B is coupled for affecting operation of switch S52, output pin C is coupled for affecting operation of switch S53 and output pin D is coupled for affecting operation of switch S54. There may be more output pins provided for microprocessor unit 550. Four output pins A,B,C,D is merely representative and is not intended as a limiting number of output pins.

A sine wave signal such as signal 52 follows a predictable and mathematical pattern. Microprocessor unit 550 timers can be employed to predict the value of the sine wave signal 52 at particular times so as to effect control of switches S51, S52, S53, S54 to accurately operate apparatus 510 in a desired manner.

By way of example and not by way of limitation, one may assume that an input voltage ($V_{in}$) for apparatus 510 is a sine wave represented by signal 52 (FIG. 2). An assumed magnitude for signal 52 may be 220 Volts RMS (Root-Means-Squared; $V_{rms}$), at 50 Hz. The maximum amplitude value $V_{max}$ (FIG. 2) may be defined as the square root of two times the RMS value of the RMS waveform. In equation form, this may be expressed as:

$$V_{max} = V_{RMS} \times \sqrt{2} \quad [1]$$

Hence, for a $V_{rms}$ of 220 volts, $V_{max} = 220 \times \sqrt{2}$, which is equal to slightly greater than 311.1 volts.

The input waveform $V_{in}$ may follow a sine wave shape over a full three hundred and sixty degrees (360°). The wave shape is positive for half the 360° (180°) and minus for the remaining half. The relationship between frequency and timing of a sine wave is well known. The full 360° cycle can be converted into timing by taking the inverse of the frequency. In this exemplary case, the inverse of 50 Hz is 1/50=20 msec. Hence, the sine wave voltage changes at a known and constant rate.

One can calculate the timing per degree by dividing 20 msec by 360°. The result can be used as "timing-per-degree constant." In this example, this timing-per-degree constant calculates to be 55.5555 μsec per degree (microseconds per degree). For purposes of this description this timing-per-degree constant will be referred to as $T_r$.

Any target voltage point in time on a sine wave can be found mathematically by multiplying the timing-per-degree constant ($T_r$) by the number of degrees between 0 and at that target voltage point. The number of degrees from 0 can be calculated by taking the arc sine of the target voltage point ($V_p$) divided by $V_{max}$. This may be expressed as:

$$T_p = T_r(A_{SIN}(V_p/V_{max})) \quad [2]$$

To solve for time $t_2$ (FIG. 2):

$$\begin{aligned} t_2 &= T_r(A_{SIN}(V_p/V_{max})) \quad &[3]\\ &= 55.555 \times 10^{-6} \times A_{SIN}(311/311) \\ &= 55.555 \times 10^{-6} \times 90° \\ &= 5.00 \times 10^{-3} \\ &= 5 \text{ msec} \end{aligned}$$

Assume for the sake of illustration that the desired output waveform presented at output loci 520, 522 is 120 $V_{RMS}$, at 50 Hz. Such a desired output waveform should not have a peak voltage exceeding 120 $V_{RMS} \times \sqrt{2} = 160$ $V_{pk}$ (peak voltage, rounded up.) To prevent the 311 $V_{pk}$ input waveform voltage from exceeding 160 $V_{pk}$, it will be desirable to turn off switch 551 at time $t_1$ (FIG. 2). The number of degrees from time $t_0$ on the sine wave shape that corresponds to 160 V is defined as the arc-sin of the ratio 160/311.

$$\begin{aligned} t_1 &= T_r(A_{SIN}(V_p/V_{max})) \quad &[4]\\ &= 55.555 \times 10^{-6} \times A_{SIN}(160/311) \\ &= 55.555 \times 10^{-6} \times 30.962° \\ &= 1.7201 \times 10^{-3} \\ &= 1.7201 \text{ msec} \end{aligned}$$

Using the example above, one can calculate timing points shown in FIG. 2. By way of example and not by way of limitation:
$t_0 = 0.0$
$t_1 = 1.7201$ msec
$t_2 = 5.0$ msec
$t_3 = 6.7201$ msec (time $t_3$ is substantially coincident with time $t_4$)
$t_4 = 6.7201$ msec
$t_5 = 10.0$ msec
$t_6 = 11.7201$ msec
$t_7 = 15.0$ msec
$t_8 = 16.7201$ msec (time $t_9$ is substantially coincident with time $t_{10}$)
$t_9 = 16.7201$ msec
$t_{10} = 20.0$ msec = $t_0$ of the next cycle If a microcontroller such as microprocessor unit 550 is provided a reference signal such as, by way of example and not by way of limitation, a zero-crossing signal that is based on a scaled down half rectified portion of an input sine wave signal, various timing points needed to control switches S51, S52, S53, S54 are easily determined. A microcontroller can precisely control the wave shape of an output signal based on the calculated points related with the input signal. Such a microprocessor-controlled embodiment as apparatus 510 may be a relatively low cost implementation, especially in consideration of design cost factors such as, by way of example and not by way of limitation, parts counts and PCB (Printed Circuit Board) space.

Figure 6:
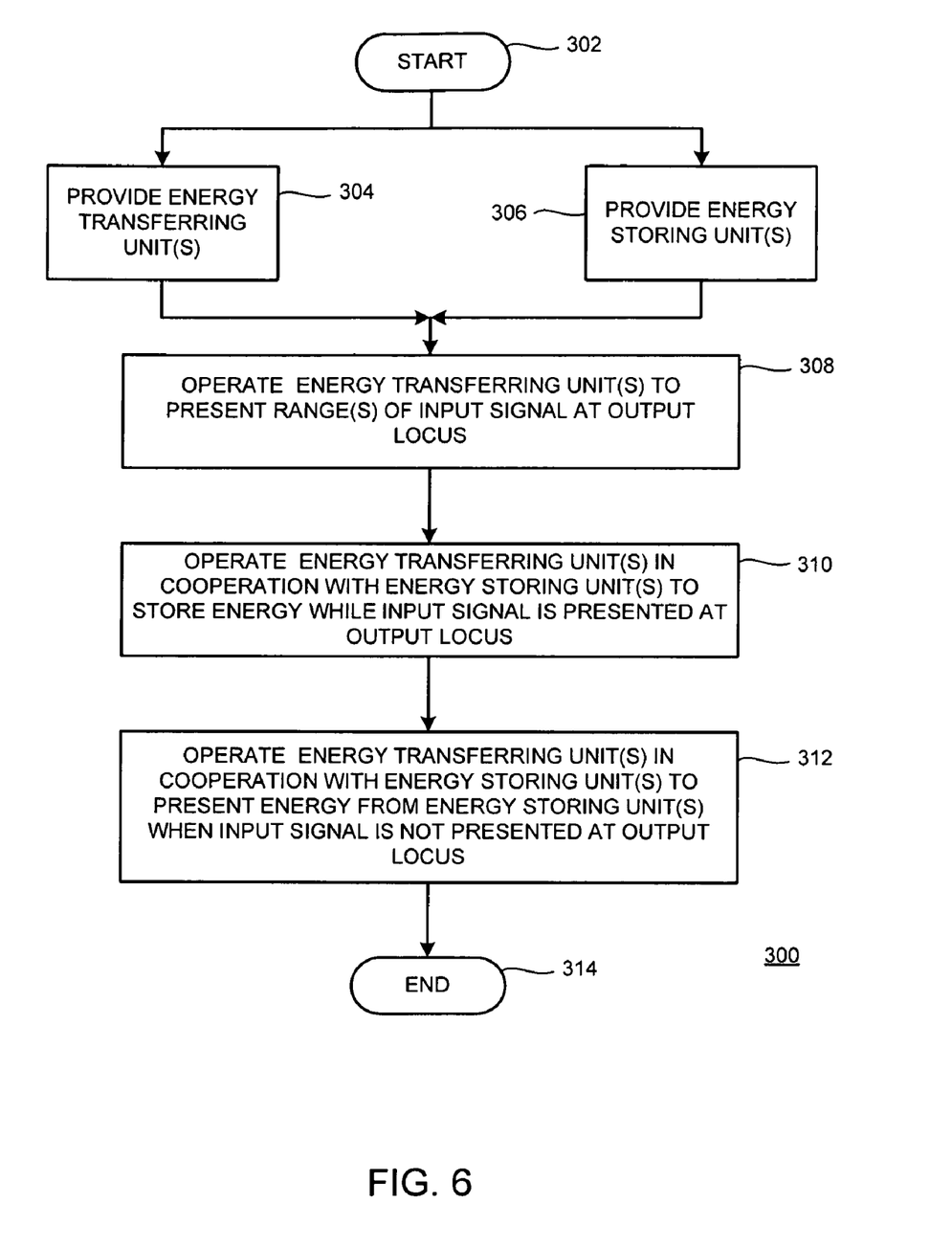
FIG. 6 is a flow diagram illustrating the method of the present invention.

FIG. 6 is a flow diagram illustrating the method of the present invention. In FIG. 5, a method 300 for shaping a varying input voltage signal received at an input locus to effect a desired varying output voltage signal at an output locus begins at a START locus 302. Method 300 continues with, in no particular order: (1) providing at least one energy transferring unit coupled with the input locus and with the output locus, as indicated by a block 304; and (2) providing at least one energy storing unit coupled with the at least one energy transferring unit, as indicated by a block 306.

Method 300 continues with operating the at least one energy transferring unit to present at least one predetermined range of the input voltage signal at the output locus, as indicated by a block 308.

Method 300 continues with operating the at least one energy transferring unit in cooperation with the at least one energy storing unit to store energy in the at least one energy storing unit while the input voltage signal is presented at the output locus, as indicated by a block 310.

Method 300 continues with operating the at least one energy transferring unit in cooperation with the at least one energy storing unit to present energy from the at least one energy storing unit at the output locus when the input voltage signal is not presented at the output locus, as indicated by a block 312. Method 300 terminates at an END locus 314.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. An apparatus for shaping a varying input voltage signal received at an input locus to effect a desired varying output voltage signal at an output locus; said input voltage signal varying at a first frequency and having a first maximum amplitude; the apparatus comprising:
   (a) at least one signal transferring unit coupled with said input locus and with said output locus; and
   (b) at least one energy storing unit coupled with said at least one signal transferring unit;
   said at least one signal transferring unit including a plurality of switch units coupled for operation at a second frequency substantially equal with said first frequency to effect passing said input voltage signal to said output locus as said output voltage signal in at least one predetermined time interval of said output voltage signal; said output voltage signal having a second maximum amplitude less than said first maximum amplitude during said at least one predetermined time interval; said at least one signal transferring unit cooperating with said at least one energy storing unit to store energy in said at least one energy storing unit and to present energy from said at least one energy storing unit at said output locus as said desired output voltage signal when said input voltage signal is not passed to said output locus; said desired output voltage signal presenting a generally square wave representation of said input voltage signal; said desired output voltage signal substantially having said second maximum amplitude.

2. An apparatus for shaping a varying input voltage signal received at an input locus to effect a desired varying output voltage signal at an output locus as recited in claim 1 wherein said input voltage signal exhibits positive signal excursions and negative signal excursions, and wherein said at least one energy storing unit comprises a first energy storing unit coupled for operating with said positive signal excursions and a second energy storing unit coupled for operating with said negative signal excursions.

3. An apparatus for shaping a varying input voltage signal received at an input locus to effect a desired varying output voltage signal at an output locus as recited in claim 1 wherein said output voltage signal is a generally square-wave representation of said input voltage signal.

4. An apparatus for shaping a varying input voltage signal received at an input locus to effect a desired varying output voltage signal at an output locus as recited in claim 3 wherein maximum excursions of said output voltage signal are less than maximum excursions of said input voltage signal.

5. An apparatus for shaping a varying input voltage signal received at an input locus to effect a desired varying output voltage signal at an output locus as recited in claim 1 wherein said input voltage signal exhibits positive signal excursions and negative signal excursions, and wherein said at least one signal transferring unit comprises a first signal transferring unit coupled for operating with said positive signal excursions and a second signal transferring unit coupled for operating with said negative signal excursions.

6. An apparatus for shaping a varying input voltage signal received at an input locus to effect a desired varying output voltage signal at an output locus as recited in claim 5 wherein said at least one energy storing unit comprises a first energy storing unit coupled for operating with said first energy transferring unit and a second energy storing unit coupled for operating with said second energy transferring unit.

7. An apparatus for shaping a varying input voltage signal received at an input locus to effect a desired varying output voltage signal at an output locus as recited in claim 6 wherein said output voltage signal is a generally square-wave representation of said input voltage signal.

8. An apparatus for shaping a varying input voltage signal received at an input locus to effect a desired varying output voltage signal at an output locus as recited in claim 7 wherein maximum excursions of said output voltage signal are less than maximum excursions of said input voltage signal.

9. An apparatus for presenting an output signal at an output locus in response to an input signal received at an input locus; said input signal exhibiting a repeating cycle at a first frequency with respect to time of positive signal excursions and negative signal excursions between a first positive extreme value and a first negative extreme value; the apparatus comprising:
   (a) a signal transferring section coupled with said input locus and with said output locus; and
   (b) an energy storing section coupled with said signal transferring section; said signal transferring section including a plurality of switch units coupled for operation at a second frequency substantially equal with said first frequency to effect substantially passing said input signal to said output locus as said output signal during a portion of said cycle; said output signal having a cycle of excursion between a second positive extreme value less than said first positive extreme value and a second negative extreme value less than said first negative extreme value; said signal transferring section cooperating with said energy storing section to present energy from said energy storing section at said output locus as said output signal when said input signal is not passed to said output locus said output signal presenting a generally square wave representation of said input signal; said output signal substantially having a cycle of excursion between said second positive extreme value and said second negative extreme value.

10. An apparatus for presenting an output signal at an output locus in response to an input signal received at an input locus as recited in claim 9 wherein said energy storing section comprises a first energy storing unit coupled for operating with said positive signal excursions and a second energy storing unit coupled for operating with said negative signal excursions.

11. An apparatus for presenting an output signal at an output locus in response to an input signal received at an input locus as recited in claim 9 wherein said output signal is a generally square-wave representation of said input signal.

12. An apparatus for presenting an output signal at an output locus in response to an input signal received at an input locus as recited in claim 11 wherein maximum excursions of said output signal are less than maximum excursions of said input signal.

13. An apparatus for presenting an output signal at an output locus in response to an input signal received at an input locus as recited in claim 9 wherein said signal transferring section comprises a first signal transferring unit coupled for operating with said positive signal excursions and a second signal transferring unit coupled for operating with said negative signal excursions.

14. An apparatus for presenting an output signal at an output locus in response to an input signal received at an input locus as recited in claim 13 wherein said energy storing section comprises a first energy storing unit coupled for operating with said first signal transferring unit and a second energy storing unit coupled for operating with said second signal transferring unit.

15. An apparatus for presenting an output signal at an output locus in response to an input signal received at an input locus as recited in claim 14 wherein said output signal is a generally square-wave representation of said input signal.

16. An apparatus for presenting an output signal at an output locus in response to an input signal received at an input locus as recited in claim 15 wherein maximum excursions of said output signal are less than maximum excursions of said input signal.

17. A method for shaping a varying input voltage signal received at an input locus to effect a desired varying output voltage signal at an output locus; said input voltage signal varying at a first frequency and having a first maximum amplitude; the method comprising:
 (a) in no particular order:
  (1) providing at least one signal transferring unit coupled with said input locus and with said output locus; said at least one signal transferring unit including a plurality of switch units; and
  (2) providing at least one energy storing unit coupled with said at least one signal energy transferring unit;
 (b) operating said plurality of switch units of said at least one signal energy transferring unit at a second frequency substantially equal with said first frequency to effect passing said input voltage signal to said output locus as said output voltage signal in a least one predetermined time interval of said output voltage signal; said output voltage signal having a second maximum amplitude less than said first maximum amplitude during said at least one predetermined time interval;
 (c) operating said at least one signal energy transferring unit in cooperation with said at least one energy storing unit to store energy in said at least one energy storing unit while said input voltage signal is passed to said output locus; and
 (d) operating said at least one signal energy transferring unit in cooperation with said at least one energy storing unit to present energy from said at least one energy storing unit at said output locus as said output voltage signal when said input voltage signal is not passed to said output locus; said output voltage signal presenting a generally square wave representation of said input voltage signal; said output voltage signal substantially having said second maximum amplitude.

18. A method for shaping a varying input voltage signal received at an input locus to effect a desired varying output voltage signal at an output locus as recited in claim 17 wherein said input voltage signal exhibits positive signal excursions and negative signal excursions, and wherein said at least one signal transferring unit comprises a first nergy transferring unit coupled for operating with said positive signal excursions and a second signal transferring unit coupled for operating with said negative signal excursions.

19. A method for shaping a varying input voltage signal received at an input locus to effect a desired varying output voltage signal at an output locus as recited in claim 18 wherein said at least one energy storing unit comprises a first energy storing unit coupled for operating with said first signal transferring unit and a second energy storing unit coupled for operating with said second signal transferring unit.

20. A method for shaping a varying input voltage signal received at an input locus to effect a desired varying output voltage signal at an output locus as recited in claim 17 wherein said input voltage signal exhibits positive signal excursions and negative signal excursions, and wherein said at least one energy storing unit comprises a first energy storing unit coupled for operating with said positive signal excursions and a second energy storing unit coupled for operating with said negative signal excursions.

* * * * *

UNITED STATES PATENT AND TRADEMARK OFFICE
CERTIFICATE OF CORRECTION

PATENT NO.        : 8,089,262 B2  Page 1 of 1
APPLICATION NO.   : 12/167498
DATED             : January 3, 2012
INVENTOR(S)       : Chuk Ko and Jerry Joseph Heep It is certified that error appears in the above-identified patent and that said Letters Patent is hereby corrected as shown below:

ON THE TITLE PAGE:

Item (54) please change the ninth word of the Title from "COMSUMPTION" to read
-- CONSUMPTION --.

IN THE SPECIFICATIONS:

Column 1, Line 3 "COMSUMPTION" should read -- CONSUMPTION --.

Signed and Sealed this
Thirteenth Day of March, 2012

David J. Kappos
*Director of the United States Patent and Trademark Office*